US011842286B2

(12) United States Patent
Manda et al.

(10) Patent No.: US 11,842,286 B2
(45) Date of Patent: Dec. 12, 2023

(54) MACHINE LEARNING PLATFORM FOR STRUCTURING DATA IN ORGANIZATIONS

(71) Applicant: ExlService Holdings, Inc., New York, NY (US)

(72) Inventors: Chaithanya Manda, Jersey City, NJ (US); Anupam Kumar, Jersey City, NJ (US); Solmaz Torabi, Austin, TX (US); Raman Kumar, New Delhi (IN); Anish Goswami, Pune (IN); Sidhant Agarwal, Ranchi (IN); Md Sharique, Bandel (IN); Diksha Malhotra, Mohali (IN); Garimella Venkata BhanuTeja, Vijayawada (IN); Arvind Singh, Dehradun (IN); Pavan Praneeth, Hyderabad (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 17/988,684

(22) Filed: Nov. 16, 2022

(65) Prior Publication Data
US 2023/0153641 A1    May 18, 2023

Related U.S. Application Data

(60) Provisional application No. 63/280,062, filed on Nov. 16, 2021.

(51) Int. Cl.
*G06N 5/022*    (2023.01)
*G06F 16/93*    (2019.01)
(Continued)

(52) U.S. Cl.
CPC ............ *G06N 5/022* (2013.01); *G06F 16/93* (2019.01); *G06F 40/284* (2020.01);
(Continued)

(58) Field of Classification Search
CPC .......... G06N 20/00; G06N 3/08; G06N 5/022; G06F 16/288; G06F 16/3344;
(Continued)

(56) References Cited

U.S. PATENT DOCUMENTS

2014/0223284 A1    8/2014   Rankin, Jr. et al.
2018/0005134 A1*   1/2018   Kish ............... G06N 3/084
(Continued)

FOREIGN PATENT DOCUMENTS

CN    113035362    6/2021
WO    2021194659   9/2021

OTHER PUBLICATIONS

ISA: Korean Intellectual Property Office, PCT Application No. PCT/US22/50160, filed Nov. 16, 2022, International Search Report and Written Opinion dated Apr. 5, 2023, 10 pages.

*Primary Examiner* — Kimberly L Wilson
*Assistant Examiner* — Cheryl M Shechtman
(74) *Attorney, Agent, or Firm* — Perkins Coie LLP

(57) ABSTRACT

An application instance that includes one or more machine learning models receives, from a subscriber computing system, a document comprising unstructured data. Based on the unstructured data, the application instance generates an optimized model input that includes a plurality of parsed document sections. For each parsed document section, the application instance generates an output set by performing, by a machine learning model, at least one key information extraction operation. The machine learning model transmits the output in structured form to a target application operated or hosted at least in part by a subscriber entity associated with the subscriber computing system.

21 Claims, 10 Drawing Sheets

(51) Int. Cl.
*G06F 40/295* (2020.01)
*G06V 30/416* (2022.01)
*G06F 40/284* (2020.01)
*G06V 30/10* (2022.01)
*G06N 20/00* (2019.01)
*G06N 3/08* (2023.01)

(52) U.S. Cl.
CPC ............ *G06F 40/295* (2020.01); *G06V 30/10* (2022.01); *G06V 30/416* (2022.01); *G06N 3/08* (2013.01); *G06N 20/00* (2019.01)

(58) Field of Classification Search
CPC ...... G06F 16/93; G06F 40/205; G06F 40/258; G06F 40/279; G06F 40/284; G06F 40/295; G06F 40/30; G06F 18/24; G06V 30/10; G06V 30/416
See application file for complete search history.

(56) References Cited

U.S. PATENT DOCUMENTS

| | | | |
|---|---|---|---|
| 2019/0213250 A1 | 7/2019 | Murphy et al. | |
| 2019/0303412 A1* | 10/2019 | Ray | G06F 40/169 |
| 2021/0012179 A1* | 1/2021 | Kalia | G06F 40/284 |
| 2021/0082062 A1* | 3/2021 | Hurd | G06N 20/00 |
| 2021/0192126 A1 | 6/2021 | Gehrmann et al. | |
| 2022/0027610 A1* | 1/2022 | Desai | G06V 30/40 |
| 2022/0179906 A1* | 6/2022 | Desai | G06N 3/045 |

* cited by examiner

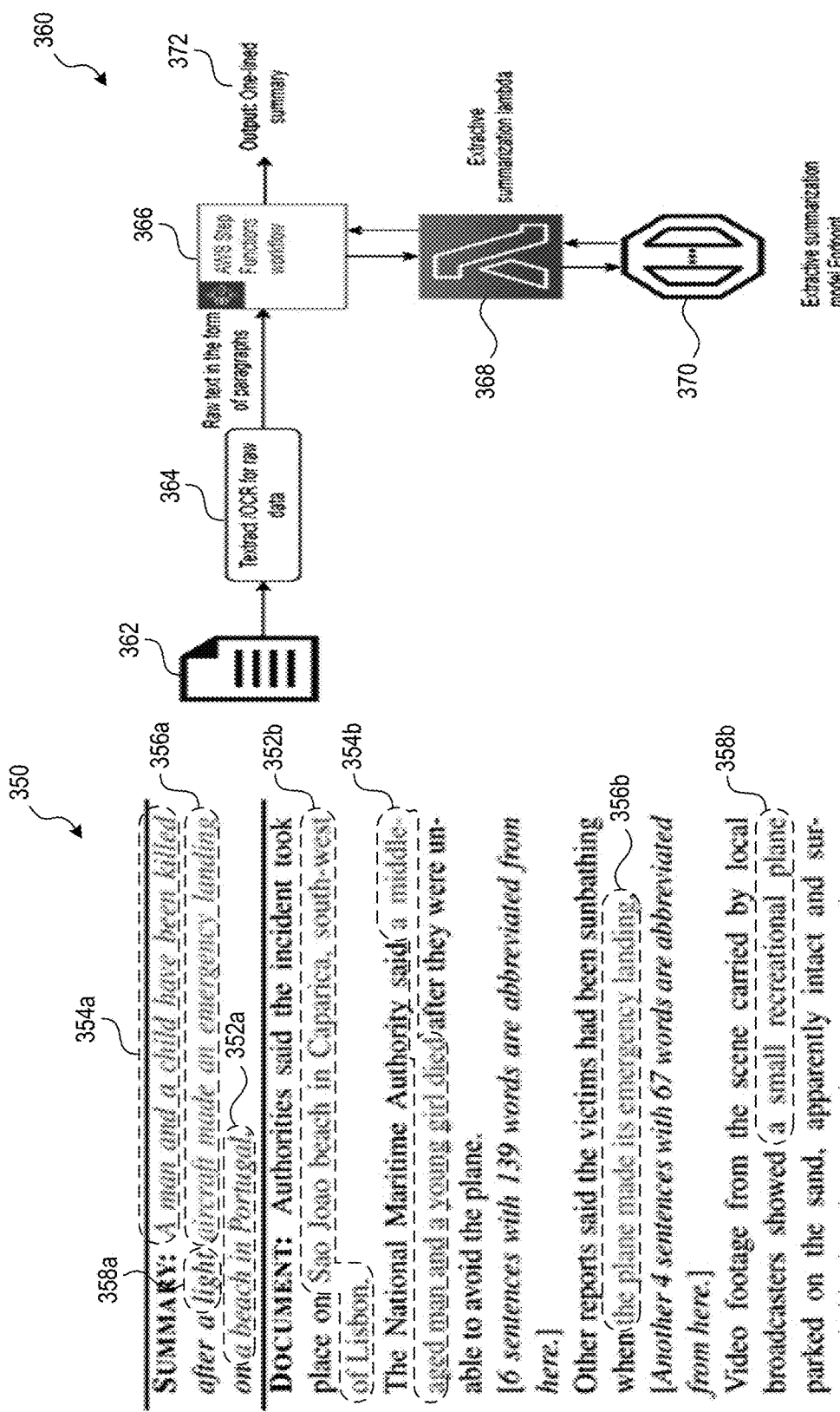

FIG. 4C

MACHINE LEARNING PLATFORM FOR STRUCTURING DATA IN ORGANIZATIONS

CROSS-REFERENCE TO RELATED APPLICATIONS

This Application claims priority to U.S. Provisional Application No. 63/280,062, filed Nov. 16, 2021, which is incorporated herein by reference in its entirety and for all purposes.

BACKGROUND

Enterprise data processing systems can rely on machine learning techniques to generate insights into enterprise data. Machine learning refers to artificial intelligence technologies that train a computing system on how to learn. Input data can be sourced for machine learning applications from different computing systems, including legacy systems, and can include data in formats that are not designed for processing by machine learning applications.

BRIEF DESCRIPTION OF THE DRAWINGS

Detailed descriptions of implementations of the present invention will be described and explained through the use of the accompanying drawings.

FIGS. 3C and 3D show extractive summarization operations of an example machine learning platform according to some implementations of the disclosed technology.

FIG. 4C shows a GUI for extracting property title information in an example machine learning platform according to some implementations of the disclosed technology.

Figure 1:
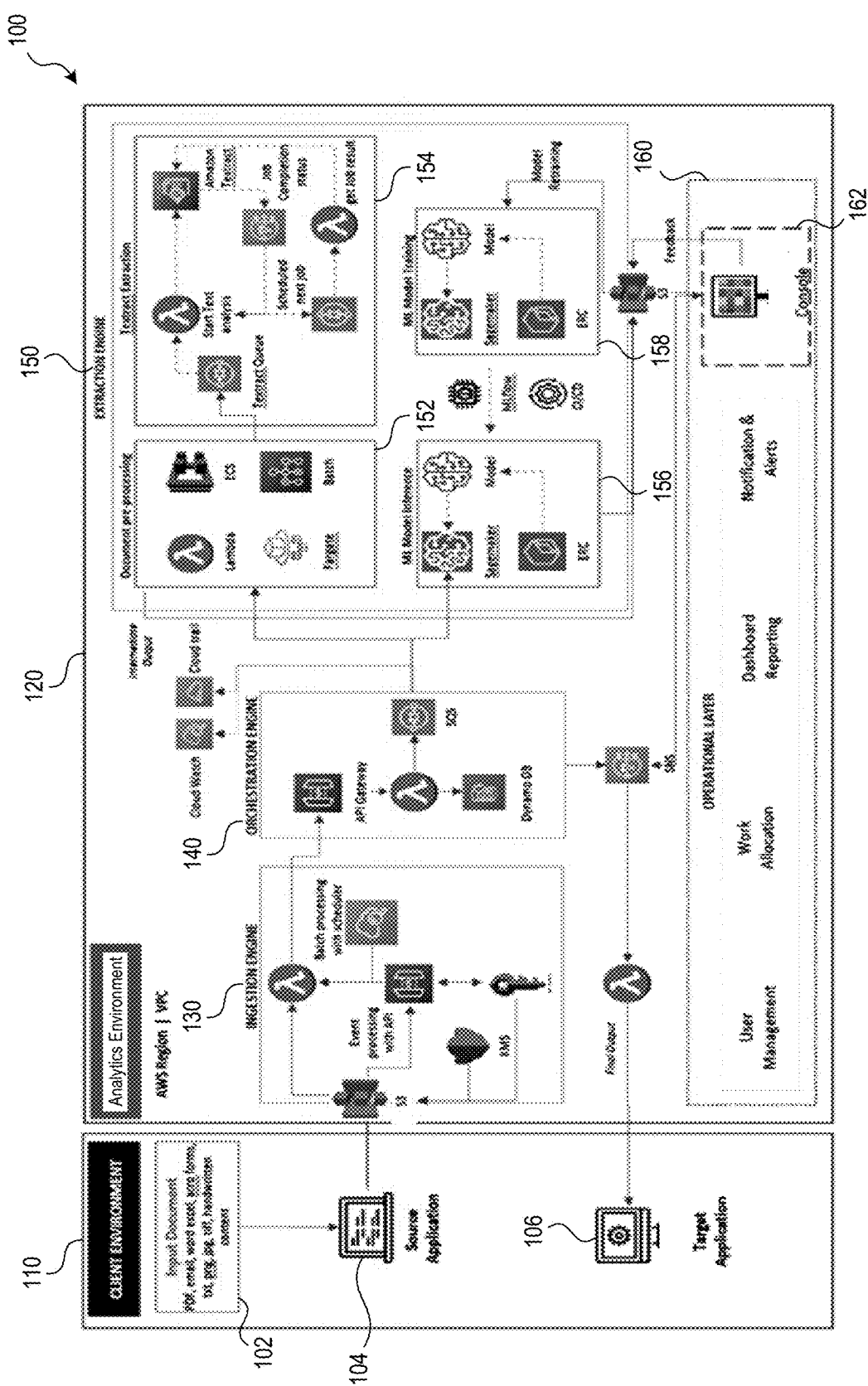
FIG. 1 is a block diagram showing an analytics environment included in the example machine learning platform according to some implementations of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As disclosed herein, a machine learning platform (also sometimes referred to herein as an analytics platform or artificial intelligence platform) can include an application instance made available to a subscriber entity in a cloud-based environment, such as, for example, in a virtual private cloud, via a virtual network, in a SaaS (software-as-a-service computing environment), PaaS (platform-as-a-service computing environment), and/or the like. The application instance can be maintained or managed, at least in part, by a provider of machine learning-based computing systems. The application instance can be communicatively coupled to a subscriber computing system.

The application instance can receive (e.g., access, retrieve, ingest), through a suitable communications interface, one or more documents from a subscriber computing system. For example, the subscriber computing system can generate or provide data regarding the subscriber entity's operations. The received documents can include structured elements, which can be individually addressable for effective use by machine learning models. However, the documents can also include semi-structured and/or unstructured data to which machine learning techniques cannot be readily applied. Unstructured data can include data in a format that is not capable of directly being processed by a machine learning model and can include images, health records, documents, books, journals, audio, video, metadata, analog data, and the like.

The machine learning platform disclosed herein can use source-agnostic machine learning models capable of extracting unstructured data across a plurality of input sources. The systems and methods disclosed herein solve the technical problem of using machine learning models on unstructured data by pre-processing unstructured data in a manner that optimizes inputs to machine learning models and standardizes data attributes across a diverse set of inputs. Advantageously, the analytics environment of the machine learning platform disclosed herein is data source and input data type agnostic.

Further, in some implementations, performance of machine learning models is improved by segmenting large, unstructured input documents such that the size of the pre-processed separate units input into the machine learning models can positively impact the relevant performance metrics of machine learning models. Such performance metrics can include, for example, classification accuracy, logarithmic loss, confusion matrix, area under curve, F1 score, mean absolute error, and/or mean square error.

Further, in some implementations, reference ontologies can be applied to input data to account for irregularities or errors in spelling. In an example use case, a predetermined accuracy threshold (e.g., 0.7, 0.8, 0.9) can be used to identity the top medication matches in the reference database to extract medication information from unstructured data. This approach has a technical advantage of improving model accuracy by identifying medication entities with a reasonable degree of accuracy even when irregulates in spelling are present.

In an embodiment, the application instance can be structured to perform pre-processing operations on at least a portion of the received document and generate an optimized model input. The optimized model input can include, for example, summary sentences, key-value pairs extracted from unstructured data, and/or the like. The optimized model input can be generated using a pre-processing machine learning model, which can be or include a convolutional neural network (CNN), a deep learning (DL) model, a translational model, a natural language processing (NLP) model, a computer vision-based model, and/or the like. Prior to generating the optimized model input, the machine learning platform can perform additional pre-processing operations, such as image quality enhancement, optical character recognition (OCR), segmentation of documents into units, form item extraction, and/or the like. The machine learning platform can perform the pre-processing operations using regular-expression based searches, named entity recognition, classification of input documents, by determining and applying relevant ontologies, and/or the like.

The machine learning platform can provide the generated optimized model input to one or more machine learning models structured to perform machine learning/artificial intelligence operations (ML/AI) on the input documents. The machine learning models can be pre-configured or configured at runtime of the application instance using, for example, a previously stored setting, a subscriber-defined runtime parameter, or a feature of the target application operated by the subscriber entity in a subscriber computing environment communicatively coupled to the machine learning platform. The configuration setting(s) can determine the type of machine learning model to be executed on a particular optimized model input data set and/or the type of output of the machine learning model. For example, the output can include data in a format suitable as input to the target application (e.g., according to an electronic messaging format accepted by the target application).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Machine Learning Platform for Structuring Data in Organizations

FIG. 1 is a block diagram showing an example machine learning platform 100. As a general overview, the machine learning platform 100 can enable entities, such as subscriber entities that operate client environments 110, to access and utilize configurable ML/AI functions on entity-provided data.

A subscriber entity can be an insurance company, a healthcare organization, a financial services organization, a professional services organization, or another service provider. The subscriber entity can be in a vendee-vendor, recipient-provider or similar business relationship with an entity that manages the machine learning platform 100. The machine learning platform 100 can receive subscriber-provided items (e.g., data, documents, interface messages, and/or the like), optimize the received items for processing, perform ML/AI operations on the optimized items, generate output according to a messaging standard suitable for the subscriber entity, and transmit the output to a target application 106 in the client environment 110.

The machine learning platform 100 can include dedicated and/or shared (multi-tenant) components and can be implemented, at least in part, as a virtual or cloud-based environment. For example, in some embodiments, the machine learning platform 100 can include a subscriber-specific application instance, shown as the analytics environment 120. The analytics environment 120 can allow subscriber entities to execute computer-based code without provisioning or managing infrastructure, such as memory devices, processors, and the like. In some embodiments, the computing resources needed for a particular computing operation can be assigned at runtime.

The machine learning platform 100 can include various engines. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like.

Some engines described herein can include machine learning models, which refer to computer-executable instructions, in compiled or executable form, structured to facilitate ML/AI operations. Machine learning models can include one or more convolutional neural networks (CNN), deep learning (DL) models, translational models, natural language processing (NLP) models, computer vision-based models, or any other suitable models for enabling the operations described herein. For instance, the machine learning models described herein can be structured and/or trained to perform various horizontal and/or domain-specific functions. Examples of horizontal functions include image redaction, text redaction, item classification (e.g., email classification), and the like. Examples of domain-specific functions include product tagging, medical records processing, insurance document processing, property records analysis, asset management, claims processing, license plate extraction, property damage inspection, first notice of loss (FNOL) processing, and the like.

The engines described herein can include accelerators, which can be or include computer-executable code for enhancing performance of machine learning models. The accelerators can include a document layout accelerator, an optical character recognition (OCR) accelerator, and/or an extractive summarizer, as described further herein. Accelerators can, for example, optimize inputs for machine learning operations, perform image quality correction, reduce the size of processing units by using pre-processing machine learning models and/or other techniques to intelligently segment data inputs, and/or the like. For instance, accelerators can be structured to identify document sections in long .pdf documents based on metadata extracted from various regions within a document.

As shown, the client environment 110 can include one or more computing entities, such as the source application 104 and/or the target application 106. The source application 104 can provide one or more items 102 to the analytics environment 120 of the machine learning platform 100. To that end, the analytics environment 120 can include an ingestion engine 130. The ingestion engine 130 can be structured to receive input items via a suitable method, such as via a user interface (e.g., by providing a GUI in an application available to a subscriber entity that allows a subscriber to enter or upload data), via an application programming interface (API), by using a file transfer protocol (e.g., SFTP), by accessing an upload directory in the file system, by accessing a storage infrastructure configured to allow the source application 104 to execute write operations and save items, and the like. In some embodiments, the storage infrastructure can include physical items, such as servers, direct-attached storage (DAS) devices, storage area networks (SAN) and the like. In some embodiments, the storage infrastructure can be a virtualized storage infrastructure that can include object stores, file stores and the like. In some embodiments, the ingestion engine 130 can include event-driven programming components (e.g., one or more event listeners) that can coordinate the allocation of processing resources at runtime based on the size of the received input item submissions and/or other suitable parameters.

A particular analytics environment 120 can be configured to receive items from multiple source applications 104 associated with a particular subscriber entity. For example, a healthcare organization, acting as a subscriber, may wish to perform analytics on data generated by different systems, such as an electronic medical records (EMR) system, a pharmacy system, a lab information system (LIS), and the like. As shown, the analytics environment 120 can include an orchestration engine 140. The orchestration engine 130 can include an API gateway, which can be structured to allow developers to create, publish, maintain, monitor, and secure different types of interface engines supported by different source applications 104. The interface engines can include, for example, REST interfaces, HTTP interfaces, WebSocket APIs, and/or the like. The orchestration engine 130 can manage interface engine operations, including error handling, routing, branching executables, and/or the like. The branching executables can include item routing logic to determine whether input items should be routed to a particular module within the extraction engine 150.

The extraction engine 150 is structured to perform pre-processing, extraction, inference, and ML/AI model training operations described herein. The extraction engine 150 can include a pre-processing engine 152, an extraction engine 154, a model inference engine 156, and/or a model training engine 158. The pre-processing engine 152 can perform pre-processing operations to generate optimized model input items. The pre-processing operations can include, for example, image quality correction, segmentation of data inputs, extractive summarization, identification of document regions and segmentation according to the identified regions, data type conversion, and the like. The extraction engine 154 can perform named entity recognition, segmentation, and other relevant operations on the pre-processed items in order to further structure the data items. The inference engine 156 can perform ML/AI operations on the optimized model input items received from the orchestration engine 140, pre-processing engine 152, and/or extraction engine 154.

The models included in the inference engine 156 can be trained using the training engine 158. In some embodiments, training can be performed in an automatic fashion. For instance, a special-purpose virtualized MLOps server (ML-flow) can connect to various artifact databases that can include model inputs, model outputs, model registries, and/or the like. The virtualized MLOps server can register various models included in the model inference engine 156, track performance of the models and outcomes of experiments, training sessions, and/or the like. In some embodiments, the training can be performed with human intervention via the console 162.

The extraction engine 150 can ingest unstructured items and output structured and/or summarized items in the form of key-value pairs, datasets, tables, summary sentences and the like. The output can be transmitted to one or more target applications 106.

Figure 2:
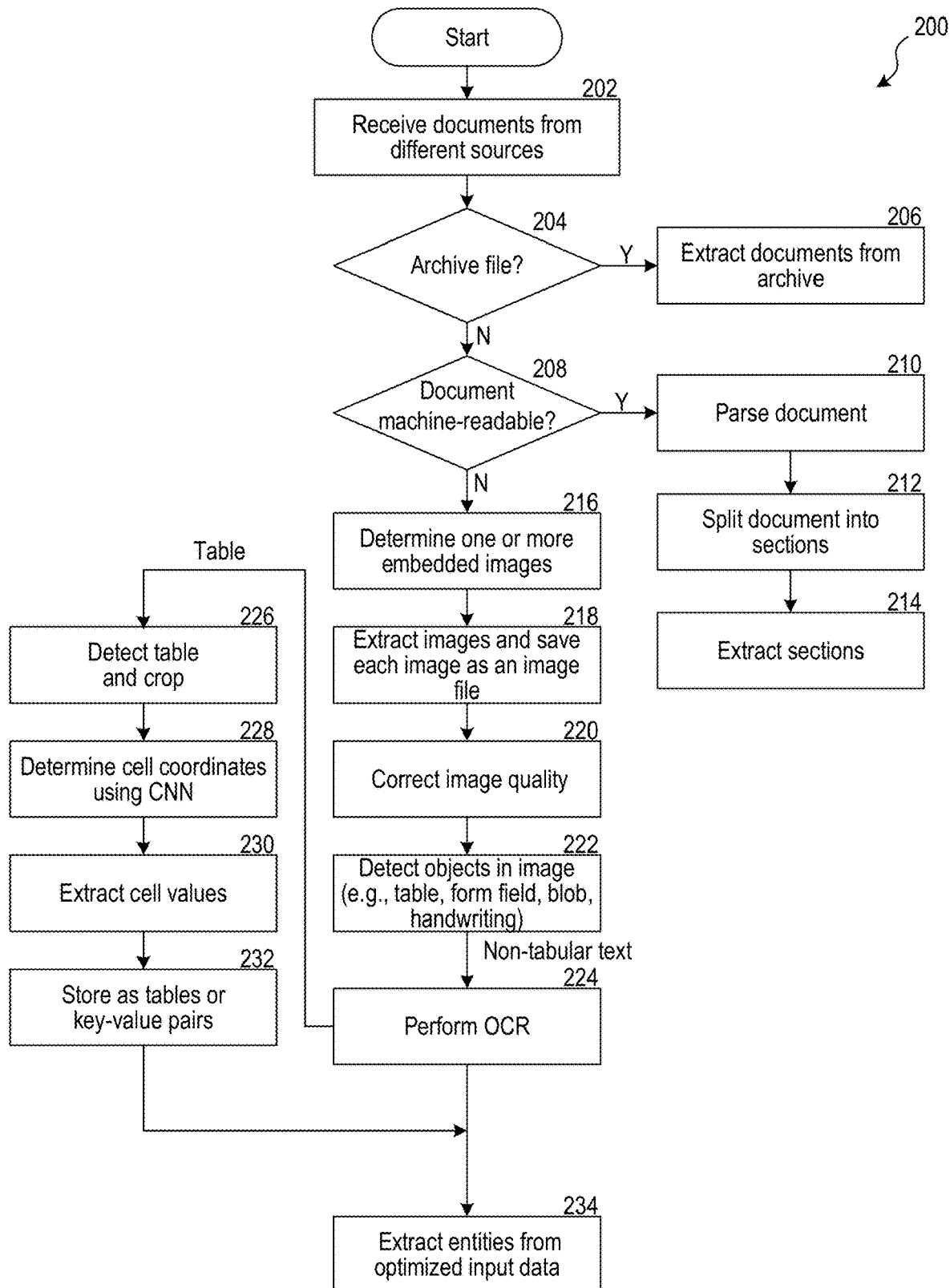
FIG. 2 is a flowchart showing data ingestion and pre-processing operations of an example machine learning platform according to some implementations of the disclosed technology.

Methods of Operation of a Machine Learning Platform for Structuring Data in Organizations FIG. 2 is a flowchart showing data ingestion and pre-processing operations 200 of an example machine learning platform. In an example embodiment, operations 200 can be performed by the extraction engine 150 of the analytics environment 120 included in the machine learning platform 100 shown in FIG. 1. However, one of skill will appreciate that operations 200 can be performed, in whole or in part, on another suitable computing device. As a general overview, the operations 200 enable the extraction engine 150 to perform pre-processing of inputs in order to make the inputs suitable for use by machine learning models of the analytics environment 120. One of skill will appreciate that operations 200 can be performed iteratively for a plurality of input items, which can be grouped according to various criteria (e.g., by data source, by topic, by time window, by machine learning platform 100 instance, in a batch file submission).

In operation, at 202, the extraction engine 150 receives one or more input items. In some embodiments, an input item is a document. More generally, an input item can include one or more computer files. At 204, the extraction engine 150 parses the file extension from the file name of the input item. At 206, the extraction engine 150 determines whether the file extension is indicative of a mixed-content file, a document archive, or the like and, if so, the extraction engine 150 extracts one or more documents from the corresponding item. As part of extracting one or more documents, the extraction engine 150 can invoke computer-executable code structured to perform specific operations for processing files of a particular type, indicated by the file extension, and save the extracted documents to a predetermined storage location. For example, if the file extension is .zip, .rar, or similar, the computer-executable code can perform document extraction and decompression operations from the corresponding archive. As another example, if the file extension is .eml, .msg or similar, the computer-executable code can traverse an object set in the corresponding email message, identify the attachment object collection, and save the files in the attachment object collection to a specified directory. As another example, if the file extension is .html or similar (indicative of the input item being a webpage), the computer-executable code can execute a web scraper and/or data locator script to identify encoded data (e.g., by parsing HTML opening and closing tags and determining corresponding data values), make requests to internal application programming interfaces (APIs) for associated data stored in a database and delivered to a browser via HTTP requests as indicated by HTML code, and the like.

At 208, the extraction engine 150 determines whether the document is machine-readable. In some embodiments, the determination regarding whether the document is machine-readable can be made based on the file extension of the document (e.g., as shown at 210, extensions such as .pdf, .docx, etc. can indicate that a document is machine-readable). In some embodiments, the determination is made via computer-executable code that scans the document to determine whether the entirety of the document is machine-readable (e.g., as shown at 216, the presence of an image in the document may indicate that the document is not machine-readable; as shown at 218, the document can contain more than one image that can be split for further processing; as shown in 220, image quality can be analyzed and various image enhancement operations applied).

When the extraction engine 150 determines that the document is machine-readable, then, at 212, the document can be split into relevant sections and, at 214, the detected sections can be extracted and fed into machine learning models as discrete, separate units, which can improve (e.g., increase a positive indicator, decrease a negative indicator) the processing efficiency and performance metrics of the machine learning models. The performance metrics can include, for example, classification accuracy, logarithmic loss, confusion matrix, area under curve, F1 score, mean absolute error, and/or mean square error. Accordingly, in some embodiments, the size of the extracted separate units input into the machine learning models can be directly or inversely proportional to the corresponding performance metrics.

At 222-232, the extraction engine 150 can perform various other operations to optimize the input items for processing by machine learning models. For example, a document layout accelerator, at 222, can perform document layout analysis and detect special items. If a text blob is detected, an OCR accelerator can, at 224, perform optical character recognition on the corresponding objects. If a table is detected, the document layout accelerator can detect, at 226, a particular table component and crop the detected table. As shown at 228, the document layout accelerator can include a pre-processing convolutional neural network trained to recognize table cells and their coordinates. The document layout accelerator can use a graph convolutional technique, at 230, or a logical locations-based technique to extract values from the tables, and, at 232, store the extracted values in structured form, such as Excel, JSON, another type of key-value pair, and/or the like.

As shown, the outputs of operations 214, 224, and/or 234 include pre-processed items optimized for inputting into machine learning models.

Figure 3A:
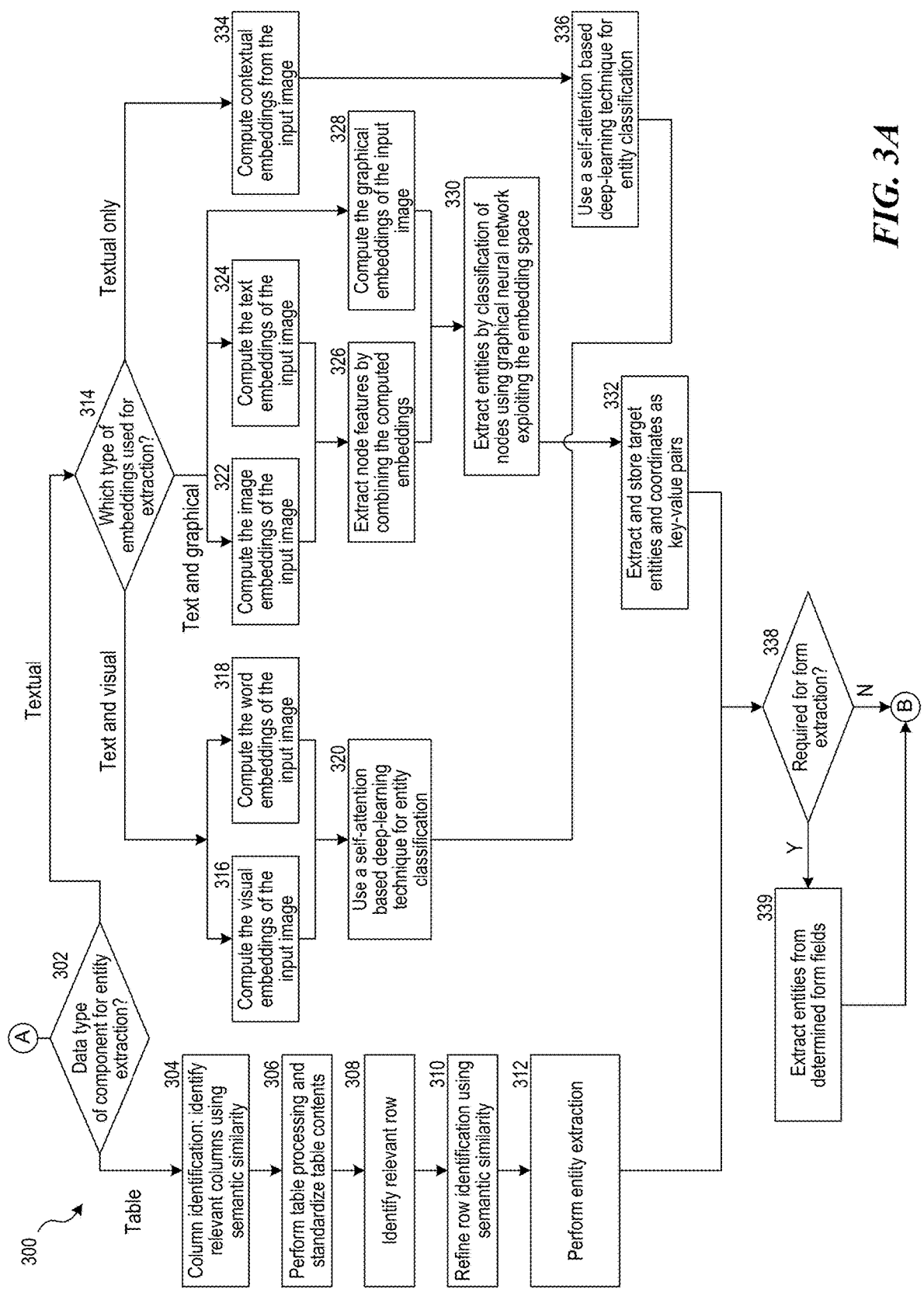
FIGS. 3A and 3B are flowcharts showing data extraction operations of an example machine learning platform according to some implementations of the disclosed technology.
Figure 3B:
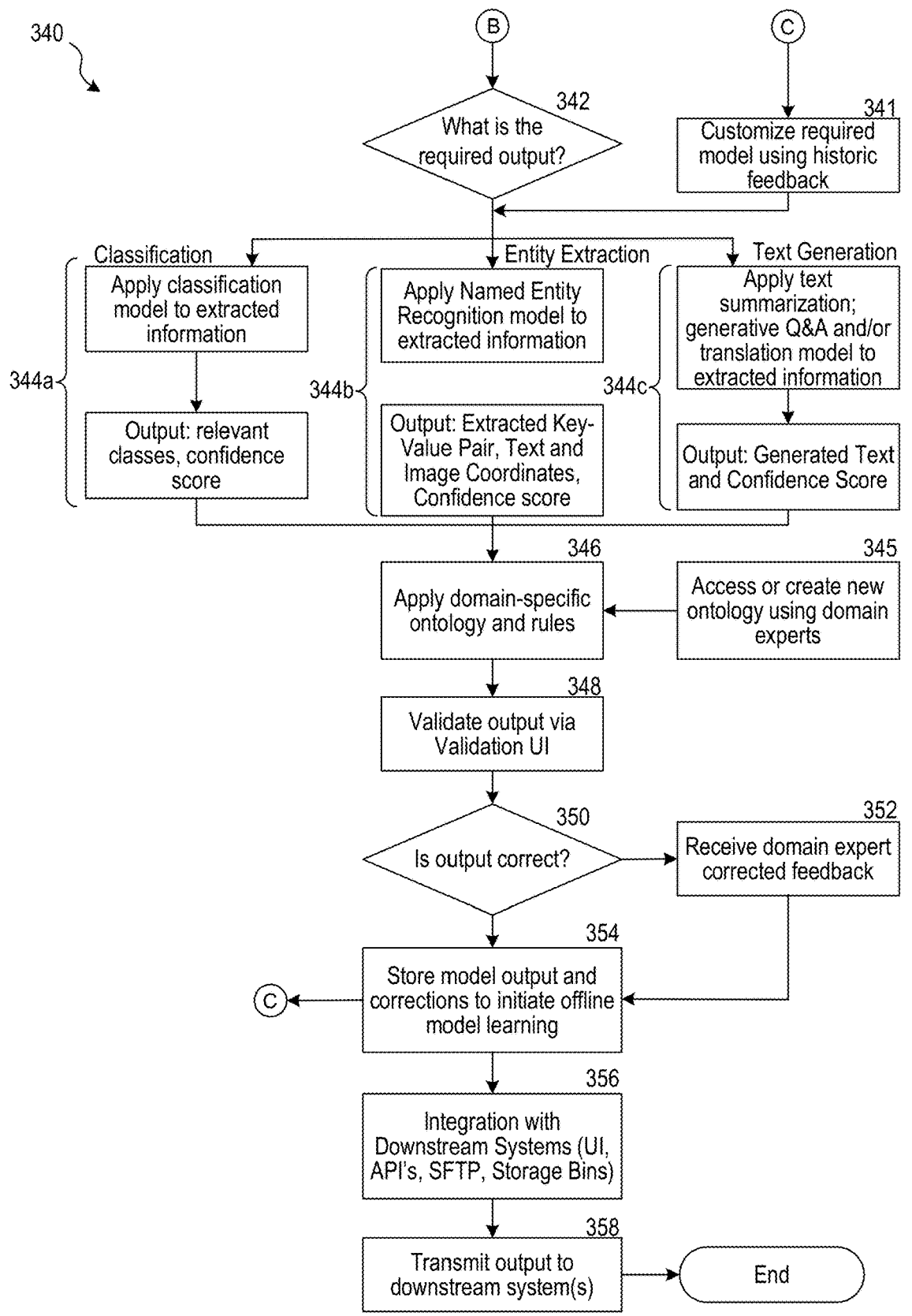

FIGS. 3A and 3B are flowcharts showing data extraction operations of the example machine learning platform. FIG. 3A shows pre-extraction optimization operations 300, and FIG. 3B shows data extraction operations 340 that can follow pre-extraction optimization operations 300 or use the output of method 200 of FIG. 2 or another suitable process. In an example embodiment, operations 300 and/or 340 can be performed by the extraction engine 150 of the analytics environment 120 included in the machine learning platform 100 shown in FIG. 1. However, one of skill will appreciate that operations 300 and/or 340 can be performed, in whole or in part, on another suitable computing device. As a general overview, the operations 300 and/or 340 enable the extraction engine 150 to optimize and execute machine learning models of the analytics environment 120. One of skill will appreciate that operations 300 and/or 340 can be performed iteratively for a plurality of input items, which can be grouped according to various criteria (e.g., by data source, by topic, by time window, by machine learning platform 100 instance, in a batch file submission).

In operation, at 302, the extraction engine 150 can identify the component for entity extraction. The component can include a table, be a non-tabular item, or a combination of the above.

When the component is a table, the extraction engine 150 can perform operations at 304-312. For example, at 304, the extraction engine 150 identifies relevant columns using a suitable technique, such as semantic similarity. The relevant terms can be supplied using a domain-specific ontology. For instance, if a domain is insurance underwriting based on a patient's medical record, a table in an input document can contain both relevant and non-relevant information, and a list of synonyms can be maintained in the ontology for the system to reference in order to identify headers for relevant columns. For example, in the case of medication, the ontology can define medication quantity related items such as "dosage" and "units" to be equivalent based on the synonyms. In some embodiments, the extraction engine 150 can traverse a set of column objects and compare column headers to items in the ontology. In some embodiments, the extraction engine 150 can start with a predetermined list of items from the ontology and traverse the set of column headers to compare ontology items to column headers. In some embodiments, the extraction engine 150 can parse items from the column headers or otherwise reduce the complexity of column headers prior to performing operations at 304.

At 306, the extraction engine 150 can standardize table content. For instance, the extraction engine 150 performs operations to identify that data values, data type, metadata, etc. across records (rows) are consistent for particular column types. For example, the extraction engine 150 confirms that no null values are present where non-null values are not allowed, that textual data is not present where numerical values are expected, and the like.

At 308, the extraction engine 150 can identify relevant rows, such as by using, at 310, semantic similarity techniques. For example, in a medical records use case, an input data structure can contain data for multiple patients. A case-specific ontology can be maintained or generated at run-time (e.g., to price an insurance policy for a particular patient) and stored in cache memory associated with a computing device on which the extraction engine 150 operates. The patient's name from the case-specific ontology can be used to extract the relevant rows from the table. In another example, each row can be converted into a single sentence and/or summarized.

At 312, the extraction engine 150 can proceed to entity extraction operations. For example, the extraction engine 150 can extract specific strings, tokens, items or values from the cells using regular expressions (a sequence of characters that specifies a search pattern in text), named entity recognition (e.g., identifying that a particular item, such as "John", is indicative of a particular type, such as "First Name"), and/or similar techniques.

If the component includes a non-tabular item, the extraction engine 150 can perform operations at 314-332. If the extraction engine 150 uses (at 314) textual embeddings along with the visual/image embeddings (at 316), the extraction engine 150 proceeds to calculate various feature vectors/embeddings such as visual/image (at 316) and word (at 318). A transformer-based deep learning model (at 320) can be applied to classify the entities into their corresponding identifiers and extract from the document.

If the extraction engine 150 uses (at 314) textual embeddings along with the graphical/relational embeddings (at 322), the extraction engine 150 proceeds to calculate various feature vectors/embeddings such as visual/image (at 322), word (at 324) and graphical/relational (at 328). Considering each word in the document as a node, the extraction engine 150 extracts the node features by combining the visual and word embeddings. A graph neural network model (at 330) can be applied to classify the nodes for extraction of entities by exploiting the embedding space (at 322, 324, 328).

If the extraction engine 150 uses (at 314) only textual embeddings, the extraction engine 150 proceeds to calculate contextual feature vectors/embeddings (at 334). A self-attention-based deep learning model (at 336) can be applied to classify the entities into their corresponding identifiers and extract from the document.

After extracting the entities, the extraction engine 150 can convert the entities and/or values to a structured format, such as Excel, JSON or another key-value data store (at 332). At 338-339, the extraction engine 150 can use the extracted entities for form extraction. For example, the extracted set of entities can be stored, at 339, in optimized fashion for form extraction. One of skill will appreciate, however, that storage and transmission of extracted entities at 338-339 is not limited to operations that require form extraction.

A set of operations 340, shown in FIG. 3B, can follow the pre-extraction optimization operations 300. The set of operations 340 can be performed by machine learning models, which can be trained, at 341, to improve accuracy, recall, and other performance parameters of the machine learning models. For example, at 341, the extraction engine 150 can generate performance metrics and/or other historical feedback for a particular machine learning model and store this data relationally to the inputs and/or outputs of the machine learning model. The stored data can be used to customize the respective model to improve its performance metrics.

At 342, the extraction engine 150 can determine the type of output needed, such as classification, entity extraction, and/or text generation. The type of output needed can be determined, for example, by pre-configured settings stored in association with a particular analytics environment 120, and/or at runtime. The type of output needed can be based on various factors, such as the application domain of the particular analytics environment 120 (e.g., medical records analytics, medication extraction from unstructured data, insurance underwriting, document redaction operations, etc.), user-specified parameters entered at runtime (e.g., via a user interface that allows a user to query unstructured input data), etc.

If the determined type of output is classification, then, at 344a, the extraction engine 150 can use a classification machine learning model to process the extracted items. The output of the classification machine learning model can include extracted data, classifiers, confidence scores, and the like. In some embodiments, classification can be performed by a machine learning model trained to perform inferential extraction on document content (e.g., where the extracted item is document content). The machine learning model can be implemented as an NLP model, computer vision based model, and/or the like. For example, an NLP model can be used to classify input documents that include emails, such as customer care emails. In another example, an NLP model can be used to identify a part of an input document as a particular medical record type (e.g., using Longformer). In another example, an NLP model can be used to identify a part of an input document as a particular sub-section of the document. In another example, computer vision can be used to extract items from a document and provide these items to an NLP model for further segmentation and identification. Computer vision model can be trained to search for particular labels within a document—for example, where a document is a form document. The labels can include various invoice fields, such as any of a purchase order number, invoice number, order number, customer number, account number, sales representative, shipping method, currency, order type, ship date, order date, delivery date, invoice date, due date, terms, bill to, and/or remit to.

If the determined type of output is entity extraction, then, at 344b, the extraction engine 150 can use an entity recognition machine learning model to process the extracted items. The output of the entity recognition machine learning model can include data (e.g., extracted key-value pairs where a key can be an entity name and a value can correspond to the extracted data item), embedded item coordinates, confidence scores, and the like.

If the determined type of output is text generation, then, at 344c, the extraction engine 150 can use a text generation machine learning model to process the extracted items (e.g., by using extractive summarization). The output of the text generation machine learning model can include data (e.g., generated text, output of text summarization operations, and/or the like), confidence scores, and the like.

One of skill will appreciate that operations at 344a, 344b, and/or 344c are not mutually exclusive and can be performed in combination or in sequence in any order. For instance, text generation operations can be performed using classified data and/or named entities. For example, the extraction engine 150 can receive a medical report that may include form fields denoting basic information about a medical event (e.g., patient name, medical record number, date, provider). The extraction engine 150 can extract named entities from the form fields on the medical report. The extraction engine 150 can classify the document as a medical report based on the detecting a combination of form fields. The extraction engine 150 can extract codified information (e.g., diagnosis code, medication code) from a free-form narrative included in the report by determining text coordinates, applying a bounding box, performing OCR operations on the determined region, tokenizing (parsing) the text returned by the OCR operations, and applying an ontology to tokens in the text to identify a diagnosis, determine a corresponding diagnostic code, identify a medication, and determine a corresponding medication code. The extraction engine 150 can summarize the medical report by generating a sentence via extractive summarization or another suitable technique. The sentence can include the determined codes.

At 346, the extraction engine 150 can standardize the output of the machine learning models with the use of an ontology supplied at 345. At 348, the extraction engine 150 can transmit the output to a computing device, such as the console 162 of FIG. 1, for validation. The extraction engine 150 can generate a validation GUI and display the output in a result set rendered on the validation GUI. The validation GUI can include data input controls structured to allow validators to specify whether the output is correct. Responsive to accepting validator feedback at 348, the extraction engine 150 can make a determination, at 350, whether the output is indicated to be correct. If indicated incorrect, the extraction engine 150 can generate or update the GUI to allow the validator to submit feedback. In some embodiments, the submitted feedback can be stored, at 354, in structured form (e.g., as a mapping between an incorrect value and an expected value, a mapping between an expected value and an input value) and provided to the model as training data.

At 356, the validated output can be provided to a downstream system, such as the target application 106 of FIG. 1.

FIGS. 3C and 3D show extractive summarization operations of the example machine learning platform. In an example embodiment, operations 360 of FIG. 3D can be performed by the extraction engine 150 of the analytics environment 120 included in the machine learning platform 100 shown in FIG. 1. However, one of skill will appreciate that operations 360 can be performed, in whole or in part, on another suitable computing device. As a general overview, automatic text summarization refers to the technique of generating short, fluent and coherent summaries from long documents such as news articles, meeting documents, lawsuits, scientific documents, clinical reports, etc. Extractive summarization aims at highlighting only main points from the documents, as determined via machine learning. Due to scarcity of time and space, it is beneficial to have automatic short summaries generated from such documents, such one-lined summaries that help in answering an question, "What is the article about?". Further benefits of extractive summarization can include the ability to extract key information from public news articles, to produce insights such as trends and news spotlights, ability to classify documents by their key contents, ability to distill important information from long documents to empower solutions such as search, question and answer formats and decision support, ability to cluster documents by their relevant content, and ability to highlight key sentences in documents.

As shown, the generated document 350 includes a summary section generated using an input document, such as a text file, an image file, or a PDF file. A transformer-type machine learning model is implemented as an extractive summarizer accelerator 368 and is trained to generate a summary sentence that includes a plurality of summary tokens 352a-358a, where each summary token corresponds to a respective input token 352b-358b parsed from the body of the input document 362. The input tokens 352b-358b, or another suitable intermediate representation of the text to be summarized, can be determined from raw text generated using OCR operations 364. The raw text can be further parsed into paragraphs before being passed to the orchestrator 372. The input tokens 352b-358b can be assigned scores, and, based on the expected length of the generated summary sentence, top K sentences can be selected for the summary. Accordingly, the number of tokens in the sets 352a-358a and/or 352b-358b can correspond to the value of K (e.g., a suitable integer value that equals to or is greater than 1).

A user can provide the input document 362, receive the summary tokens 352a-358a and otherwise interact with the extractive summarizer accelerator 368 via the endpoint 370, which can include a URL generated for a particular instance of the analytics environment 120 and structured to serve as the entry point for a web service component of the extractive summarizer accelerator 368.

One of skill will appreciate that, in some embodiments, extractive summarization can be performed iteratively—that is, summarized generated summary paragraphs or sentences can be further summarized through another iteration of the extractive summarization process.

Use Cases for a Machine Learning Platform for Structuring Data in Organizations

Figure 4A:
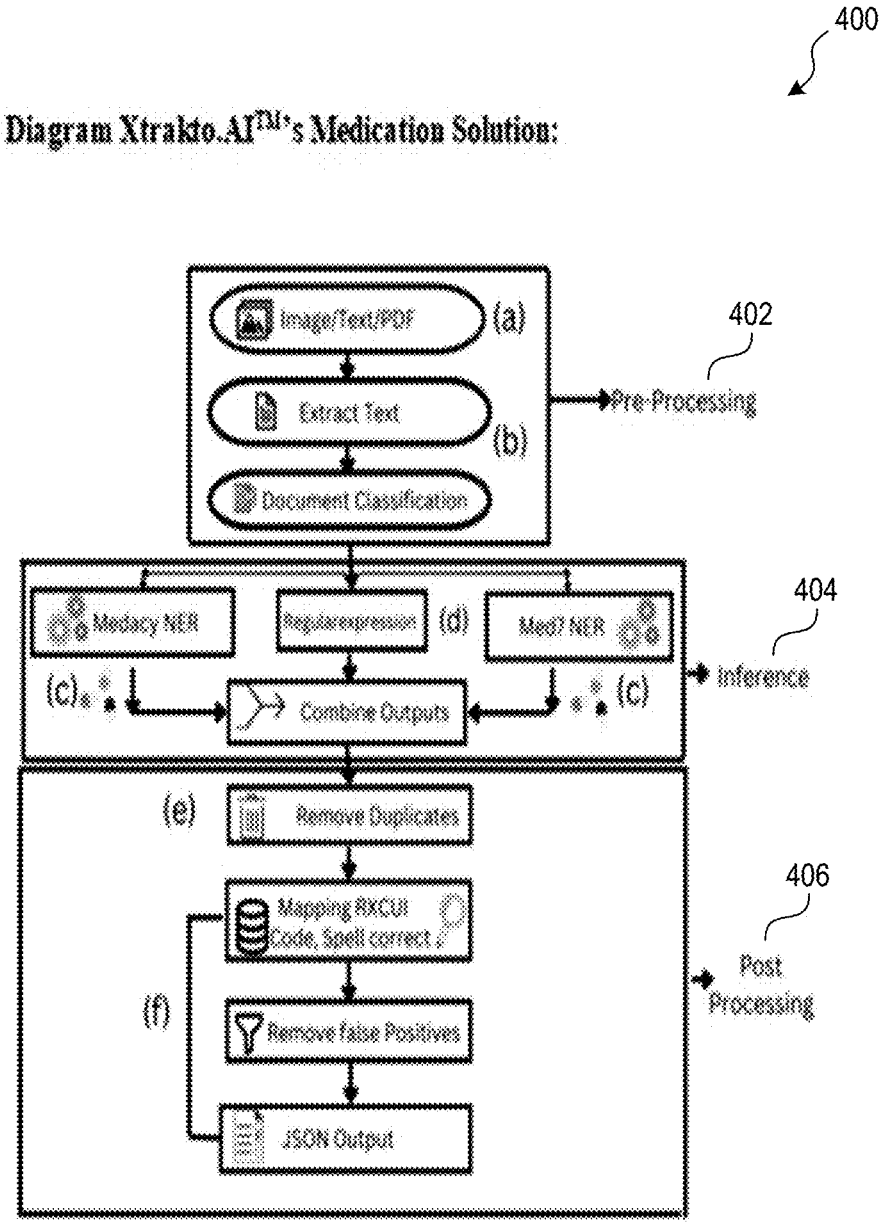
FIGS. 4A and 4B show operations and a graphical user interface (GUI) for extracting medication solution data in an example machine learning platform according to some implementations of the disclosed technology.
Figure 4B:
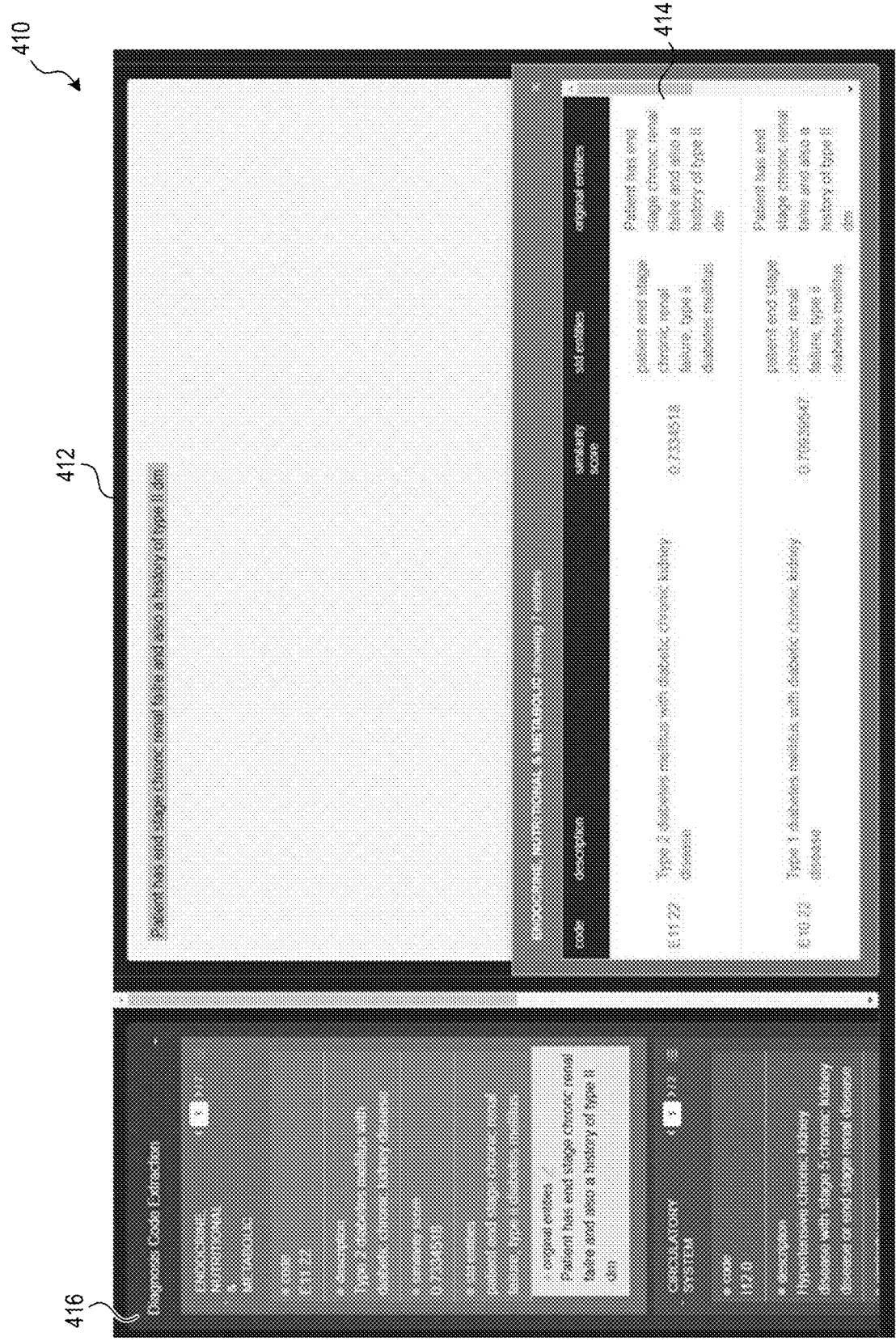

FIGS. 4A and 4B show operations and a graphical user interface (GUI) for extracting medication solution data in the example machine learning platform. In an example embodiment, operations 400 of FIG. 4A can be performed by the extraction engine 150 of the analytics environment 120 included in the machine learning platform 100 shown in FIG. 1. However, one of skill will appreciate that operations 400 can be performed, in whole or in part, on another suitable computing device. As a general overview, medical documentation can include a wealth of unstructured data. Extracted medication information can be utilized in insurance claim settlement, risk adjustment, life and health underwriting, Attending Physician Statement (APS) assessment and summarization, and in other settings.

As shown in FIG. 4A, operations 400 can include pre-processing operations 402, inference operations 404, and/or post-processing operations 406. The GUI of FIG. 4B shows a corresponding validator user interface, where an input string 412 is shown relationally to the determined corresponding ontology entities 414. In some embodiments, the determined ontology entities 414 can be assigned confidence scores, expected similarity scores, or similar metrics, which can improve over time as the model is trained on additional data. The ontology entity browser 416 can provide further information about each ontology entity.

In operation, as part of pre-processing operations 402, the extraction engine 150 can accept input data, such as the input string 412. Input to the model can be homogenous or heterogeneous, such as one or more of text, image, .pdf file, scanned document, and/or .tiff file. The input pre-processing can include special-purpose operations for extracting text from document images, arranging document in order, pre-processing skewed images, and so forth. An example pre-processing architecture can include named entity recognition models, such as Med7, Medacy, or another suitable open-source or proprietary model. The models can extract medication and related entities from the input file and classify them as drug name, dosage, strength, form, route, etc.

As part of inference operations 404, the extraction engine 150 can extract medication names using regular expressions. In some embodiments, the extraction engine 150 can use an open-source or proprietary ontology that may include a dictionary of medication names. An example ontology can include any of a name of medical condition (e.g., "diabetes"), a severity category, a valid provider credential for treating the condition (e.g., one or more of "ACNP", "ANP", "APN", "ARNP", "CANP", "CFNP", "CNM", "CNP", "CRNA", "CCC-A", "CNS", "CRNA", "DC", "DO", "DPM", "FNP", "LCSW", "MD", "NP", "OD", "OT", "PA", "PA-C", "PT", "RNP", "APRN", "ACNS", "SLP", "Ph.D"), and so forth. An example ontology can include a type of an input document to which the ontology may apply, and machine learning models can be optimized to only consider the relevant input documents (e.g., consult notes, office visit summaries, annual wellness visits, operative reports, etc.) for applying the ontology. An example ontology can include a one-to-many mapping of diagnostic codes to keywords. For example, a particular diagnostic code ("E11.311"—"Type 2 diabetes mellitus with unspecified diabetic retinopathy with macular edema") can be mapped to a plurality of synonyms to optimize the semantic similarity techniques used by the machine learning models. An example ontology can include a prioritized list of sections in a particular medical document, such that synonyms found in different sections are assigned different weights or accuracy scores that correspond to a likelihood that a particular item in a document corresponds to the specified diagnostic code. For example, if the machine learning model encounters the synonyms in the chief complaint section of the document, the relative expected accuracy can be higher than when the term is encountered in the medical history section. An example ontology can include a list of condition-specific keywords. An example ontology can include respective medications, procedures, surgical treatment, diagnostic procedures, lab value ranges, and so forth.

As part of post-processing operations 406, the extraction engine 150 can determine medication-related entities in the input document and identify a corresponding medication code (e.g., an RxCUI code) for the medication-related entity. In an example embodiment, extracted medication entities are matched with medication names in a reference database, such as the RxNorm database available at nih.gov. The matching can be performed using a suitable technique. For instance, one example implementation used the SequenceMatcher function of the difflib library, which uses the Levenshtein distance technique to match two strings and provide a match score. A predetermined accuracy threshold (e.g., 0.7, 0.8, 0.9) can be used to identity the top medication matches in the reference database. This approach has a technical advantage of improving model accuracy by identifying medication entities with a reasonable degree of accuracy even when irregulates in spelling are present. In some embodiments, post-processing operations at 406 can include operations to pass entities through a spell checker module to fix spelling issues by, for example, referencing the relevant ontology. In some embodiments, post-processing operations at 406 can include operations to map spell-corrected medication entities to fetch corresponding RxCUI codes. In some embodiments, post-processing operations at 406 can include operations to generate output in a key-value format (e.g., JSON).

Figure 4C:
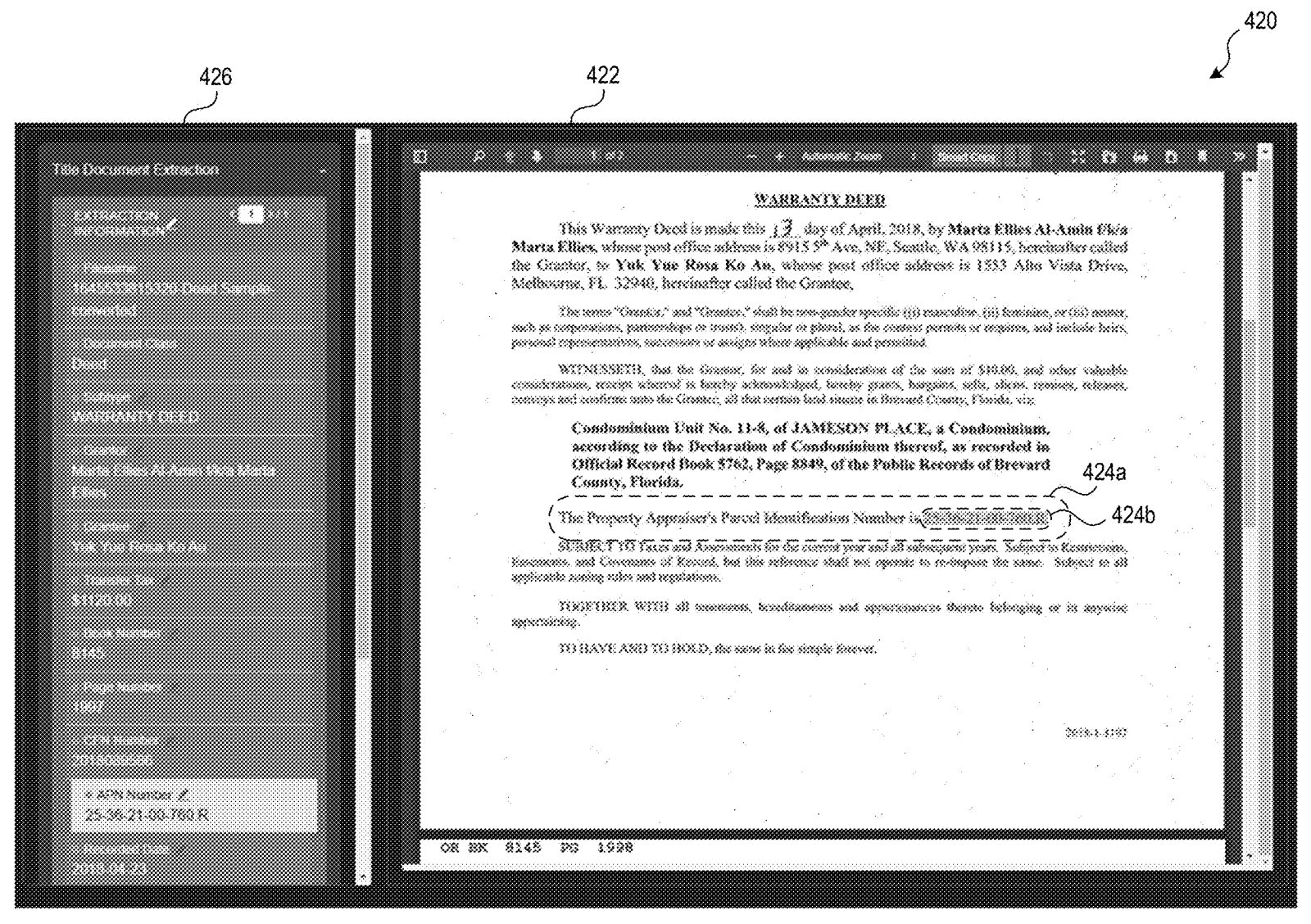

FIG. 4C shows a GUI for extracting property title information in the example machine learning platform. As a general overview, real property records can include a wealth of unstructured data. Extracted property information can be utilized in insurance claim settlement, risk adjustment, to facilitate transactions, and in other settings.

The GUI of FIG. 4C shows a validator user interface 420, where an input string 424a is shown relationally to an example determined entity 424b identified using named entity recognition or another suitable technique. In some embodiments, the determined entities 424b can be assigned confidence scores, expected similarity scores, or similar metrics, which can improve over time as the model is trained on additional data. The entity browser 426 can provide further information about each determined entity. As shown, the input document 422 can include a plurality of determined entities identified using a suitable machine learning technique.

Computer System

Figure 5:
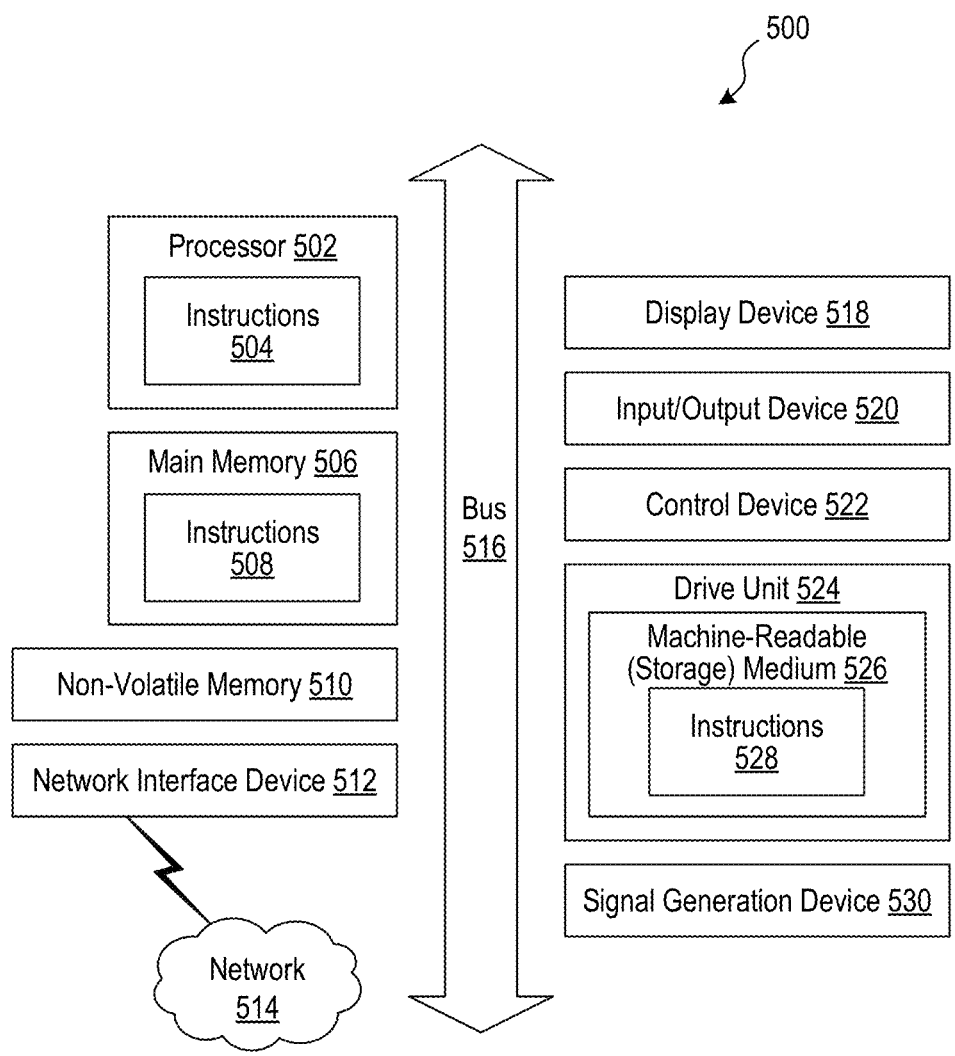
FIG. 5 is a block diagram showing some of the components typically incorporated in at least some of the computer systems and other devices on which the disclosed machine learning platform operates according to some implementations of the disclosed technology.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computer system 500 to exchange data in a network 514 with an entity that is external to the computing system 500 through any communication protocol supported by the computer system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Computing Environment

Figure 6:
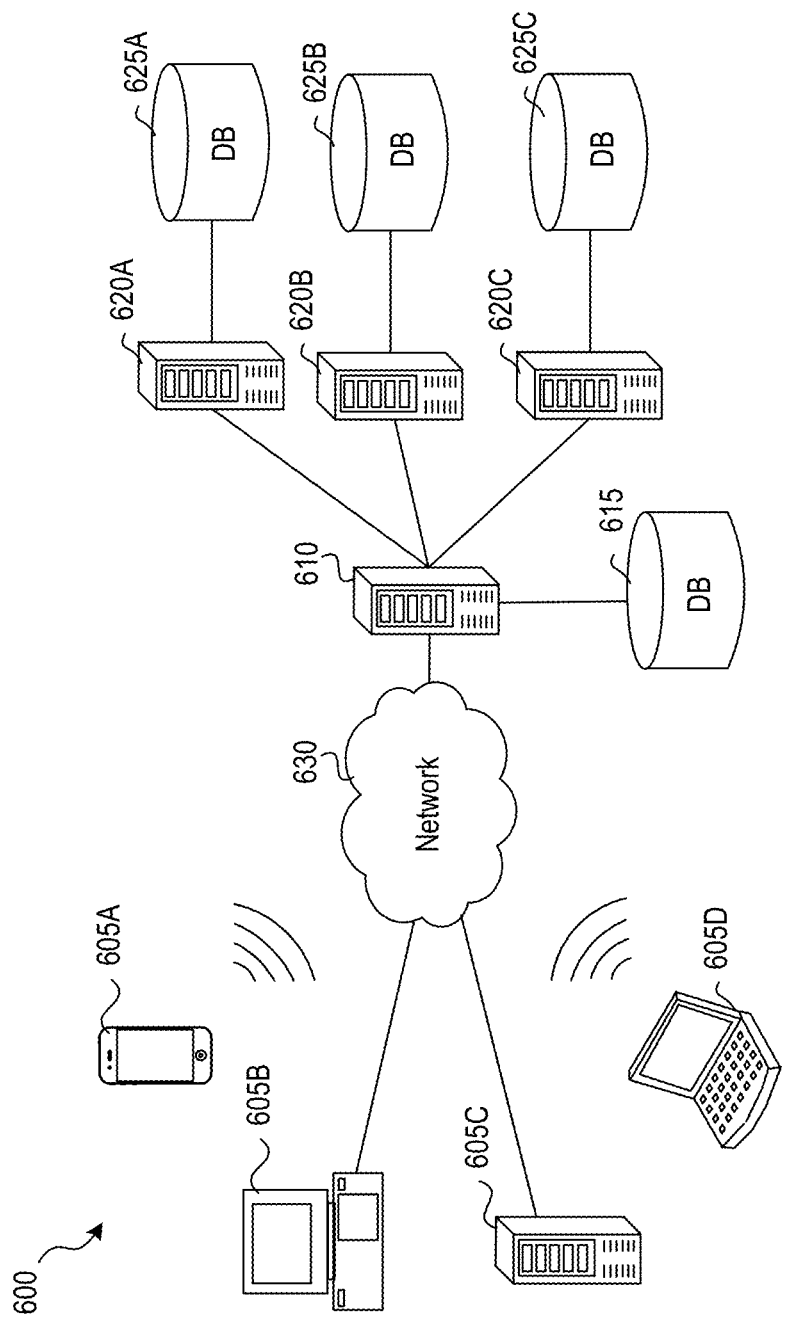
FIG. 6 is a system diagram illustrating an example of a computing environment in which the disclosed machine learning platform operates according to some implementations of the disclosed technology.

FIG. 6 is a system diagram illustrating an example of a computing environment in which the disclosed system operates in some embodiments. In some embodiments, environment 600 includes one or more client computing devices 605A-D, examples of which can host the machine learning platform 100. Client computing devices 605 operate in a networked environment using logical connections through network 630 to one or more remote computers, such as a server computing device.

In some embodiments, server 610 is an edge server which receives client requests and coordinates fulfillment of those requests through other servers, such as servers 620A-C. In some embodiments, server computing devices 610 and 620 comprise computing systems, such as the machine learning platform 100. Though each server computing device 610 and 620 is displayed logically as a single server, server computing devices can each be a distributed computing environment encompassing multiple computing devices located at the same or at geographically disparate physical locations. In some embodiments, each server 620 corresponds to a group of servers.

Client computing devices 605 and server computing devices 610 and 620 can each act as a server or client to other server or client devices. In some embodiments, servers (610, 620A-C) connect to a corresponding database (615, 625A-C). As discussed above, each server 620 can correspond to a group of servers, and each of these servers can share a database or can have its own database. Databases 615 and 625 warehouse (e.g., store) information pertinent to applications described herein, including input data, intermediate processing results, output data, and/or post-processing data. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. In some embodiments, network 630 is the Internet or some other public or private network. Client computing devices 605 are connected to network 630 through a network interface, such as by wired or wireless communication. While the connections between server 610 and servers 620 are shown as separate connections, these connections can be any kind of local, wide area, wired, or wireless network, including network 630 or a separate public or private network.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory computer readable storage media excluding transitory signals, the storage media storing instructions, which when executed by at least one processor, cause the at least one processor to perform operations comprising:

receiving, at an application instance communicatively coupled to a subscriber computing system of a plurality of subscriber computing systems, a document comprising a first set of unstructured data;

performing pre-processing operations on at least a portion of the document comprising the first set of unstructured data, the pre-processing operations comprising generating an optimized model input comprising a plurality of parsed document sections;

for each parsed document section in the plurality of parsed document sections, generating a first output set by performing, by a trained machine learning model, at least one key information extraction operation, the key information extraction operation comprising one or more of extractive summarization, named entity extraction, or classification, wherein the at least one trained machine learning model is trained using two or more of:
a second set of unstructured data previously received from the subscriber computing system,
a reference ontology,
a second output set corresponding to the second set of unstructured data, or
a confidence value for an item in the second output set; and transmitting the first output set to a target application operated or hosted at least in part by the subscriber computing system or a subscriber entity associated with the subscriber computing system.

2. The media of claim 1, wherein the subscriber computing system and the target application are provided by the subscriber entity, and wherein the application instance is provided by a provider entity different from the subscriber entity.

3. The media of claim 1, wherein the application instance is on a virtual network associated with the subscriber entity.

4. The media of claim 1, wherein the operations further comprise splitting the document comprising unstructured data into at least a first section and a second section, and wherein separate pre-processing operations are performed on the first section and the second section.

5. The media of claim 1, wherein the document comprising unstructured data comprises at least one linked sub-document in a collection of sub-document objects relationally linked to the document, the pre-processing operations comprising:
traversing the collection of sub-document objects; and
for each sub-document object in the collection of sub-document objects, retrievably storing the sub-document object; and
generating a separate optimized model input.

6. The media of claim 5, wherein the document comprising unstructured data comprises embedded markup-language code, and wherein traversing the collection of sub-document objects comprises retrieving an object indicated by the markup-language code.

7. The media of claim 5, wherein the document comprising unstructured data is an email message, and wherein traversing the collection of sub-document objects comprises determining and accessing at least one attachment associated with the email message.

8. The media of claim 1, wherein the document comprising unstructured data includes a combination of text and images, and wherein the pre-processing operations further comprise scanning the document to identify respective text or images.

9. The media of claim 1,
wherein the pre-processing operations comprise at least one of performing optical character recognition on at least a portion of the document comprising unstructured data or extracting a form field from the document comprising unstructured data,
and wherein the portion of the document is identified by determining relative coordinates of the portion of the document by a pre-processing convolutional neural network structured to generate the optimized model input.

10. The media of claim 1, wherein generating optimized model input comprises applying a domain-specific ontology to the document.

11. The media of claim 10, wherein the domain-specific ontology relates to at least one of a health condition or a medication.

12. The media of claim 1, wherein generating optimized model input comprises determining a type of output needed based on at least one of: a previously stored setting, a subscriber-defined runtime parameter or a feature of the target application.

13. The media of claim 1, wherein the first output set comprises a plurality of key-value pairs.

14. The media of claim 1, wherein the first output set comprises a table.

15. The media of claim 1, wherein the optimized model input comprises a plurality of sentence tokens, and wherein the first output set comprises a summary sentence generated based on the sentence tokens.

16. The media of claim 1, wherein the optimized model input comprises a key-value pair.

17. A computer-implemented method, the method comprising:
receiving, at an application instance communicatively coupled to a subscriber computing system of a plurality of subscriber computing systems, a document comprising a first set of unstructured data;
performing pre-processing operations on at least a portion of the document comprising the first set of unstructured data, the pre-processing operations comprising generating an optimized model input comprising a plurality of parsed document sections;
for each parsed document section in the plurality of parsed document sections, generating a first output set by performing, by a trained machine learning model, at least one key information extraction operation, the key information extraction operation comprising one or more of extractive summarization, named entity extraction, or classification,
wherein the at least one trained machine learning model is trained using two or more of:
a second set of unstructured data previously received from the subscriber computing system,
a reference ontology,
a second output set corresponding to the second set of unstructured data, or
a confidence value for an item in the second output set; and
transmitting the first output set to a target application operated or hosted at least in part by the subscriber computing system or a subscriber entity associated with the subscriber computing system.

18. The method of claim 17, wherein the application instance is on a virtual network associated with the subscriber entity.

19. A provider computing system comprising at least one processor, at least one memory, and one or more non-transitory computer readable medium storing instructions, which when executed by the at least one processor, perform operations comprising:
receive, at an application instance of the provider computing system, the application instance communicatively coupled to a subscriber computing system of a plurality of subscriber computing systems, a document comprising a first set of unstructured data;
perform pre-processing operations on at least a portion of the document comprising the first set of unstructured data, the pre-processing operations comprising generating an optimized model input comprising a plurality of parsed document sections;

for each parsed document section in the plurality of parsed document sections, generate a first output set, comprising operations to perform, by a trained machine learning model, at least one key information extraction operation, the key information extraction operation comprising one or more of extractive summarization, named entity extraction, or classification, wherein the at least one trained machine learning model is trained using two or more of:
a second set of unstructured data previously received from the subscriber computing system,
a reference ontology,
a second output set corresponding to the second set of unstructured data, or
a confidence value for an item in the second output set; and transmit the first output set to a target application operated or hosted at least in part by the subscriber computing system or a subscriber entity associated with the subscriber computing system.

20. The system of claim 19, wherein the application instance is on a virtual network associated with the subscriber entity.

21. The system of claim 19, wherein the reference ontology comprises at least one of medication unit information or medication dosage information.

\* \* \* \* \*